(12) United States Patent
Miura et al.

(10) Patent No.: US 12,511,777 B2
(45) Date of Patent: Dec. 30, 2025

(54) AUTOMATIC GUIDED VEHICLE POSITIONING BASED UPON PASSAGE WIDTH

(71) Applicant: CANON KABUSHIKI KAISHA, Tokyo (JP)

(72) Inventors: Shoko Miura, Tokyo (JP); Makoto Tomioka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 46 days.

(21) Appl. No.: 17/687,062

(22) Filed: Mar. 4, 2022

(65) Prior Publication Data

US 2022/0292713 A1  Sep. 15, 2022

(30) Foreign Application Priority Data

Mar. 9, 2021  (JP) .................................. 2021-037807

(51) Int. Cl.
   *G06T 7/73*  (2017.01)
   *G01C 21/30*  (2006.01)
   *G06V 10/74*  (2022.01)

(52) U.S. Cl.
   CPC ............... *G06T 7/73* (2017.01); *G01C 21/30* (2013.01); *G06V 10/761* (2022.01); *G06T 2200/04* (2013.01); *G06T 2207/30252* (2013.01)

(58) Field of Classification Search
   CPC .................. G06T 7/73; G06T 2200/04; G06T 2207/30252; G06V 10/761; G01C 21/30
   See application file for complete search history.

(56) References Cited

U.S. PATENT DOCUMENTS

| 11,768,504 | B2 * | 9/2023 | Ebrahimi Afrouzi .. G06N 3/082 701/25 |
| 2018/0217614 | A1 * | 8/2018 | Salas-Moreno ........ B64D 47/08 |

(Continued)

FOREIGN PATENT DOCUMENTS

JP  2020013560 A  1/2020

OTHER PUBLICATIONS

Mur-Atal, et al., ORB-SLAM2: An Open-Source SLAM System for Monocular, Stereo and RGB-D Cameras, IEEE Transactions on Robotics, vol. 33(5) 1255-1262, Jun. 2017.

*Primary Examiner* — Scott A Browne
*Assistant Examiner* — Terry C Buse
(74) *Attorney, Agent, or Firm* — Canon U.S.A., Inc. IP Division

(57) ABSTRACT

An information processing apparatus includes a first selection unit configured to select at least one map element from first three-dimensional map information including map elements each including a position and orientation of an image capturing apparatus mounted on a mobile object and three-dimensional positional information in an environment about a feature point included in an image of the environment captured by the image capturing apparatus, a second selection unit configured to select a map element including a feature point with three-dimensional positional information within a predetermined distance from a position indicated by the three-dimensional positional information about a feature point included in the map element selected by the first selection unit from map elements in second three-dimensional map information preliminarily created for the environment, and an association unit configured to associate the map element selected by the first selection unit with the map element selected by the second selection unit.

13 Claims, 4 Drawing Sheets

(56) References Cited

U.S. PATENT DOCUMENTS

| | | | |
|---|---|---|---|
| 2019/0189006 A1* | 6/2019 | Toma | G01C 21/28 |
| 2019/0346271 A1* | 11/2019 | Zhang | G01C 21/1656 |
| 2020/0284587 A1* | 9/2020 | Hare | G06T 7/70 |
| 2021/0095992 A1* | 4/2021 | Kitaura | G06T 7/579 |
| 2021/0181745 A1* | 6/2021 | Liu | G05D 1/0274 |
| 2021/0318122 A1* | 10/2021 | Kojima | G08G 1/0112 |
| 2022/0026920 A1* | 1/2022 | Ebrahimi Afrouzi | G05D 1/0219 |
| 2022/0187841 A1* | 6/2022 | Ebrahimi Afrouzi | G05D 1/0274 |
| 2023/0288209 A1* | 9/2023 | Zhang | H04W 4/38 |
| 2023/0384114 A1* | 11/2023 | Kruse | G01C 21/3811 |
| 2024/0119614 A1* | 4/2024 | Ebrahimi Afrouzi | A47L 11/4061 |

* cited by examiner

FIG.3
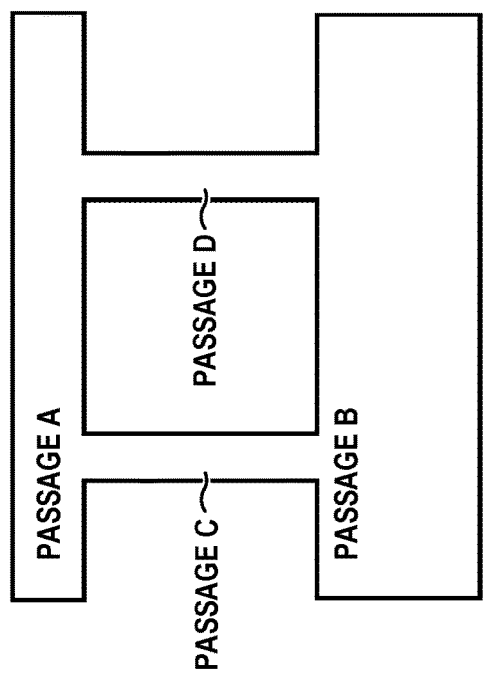
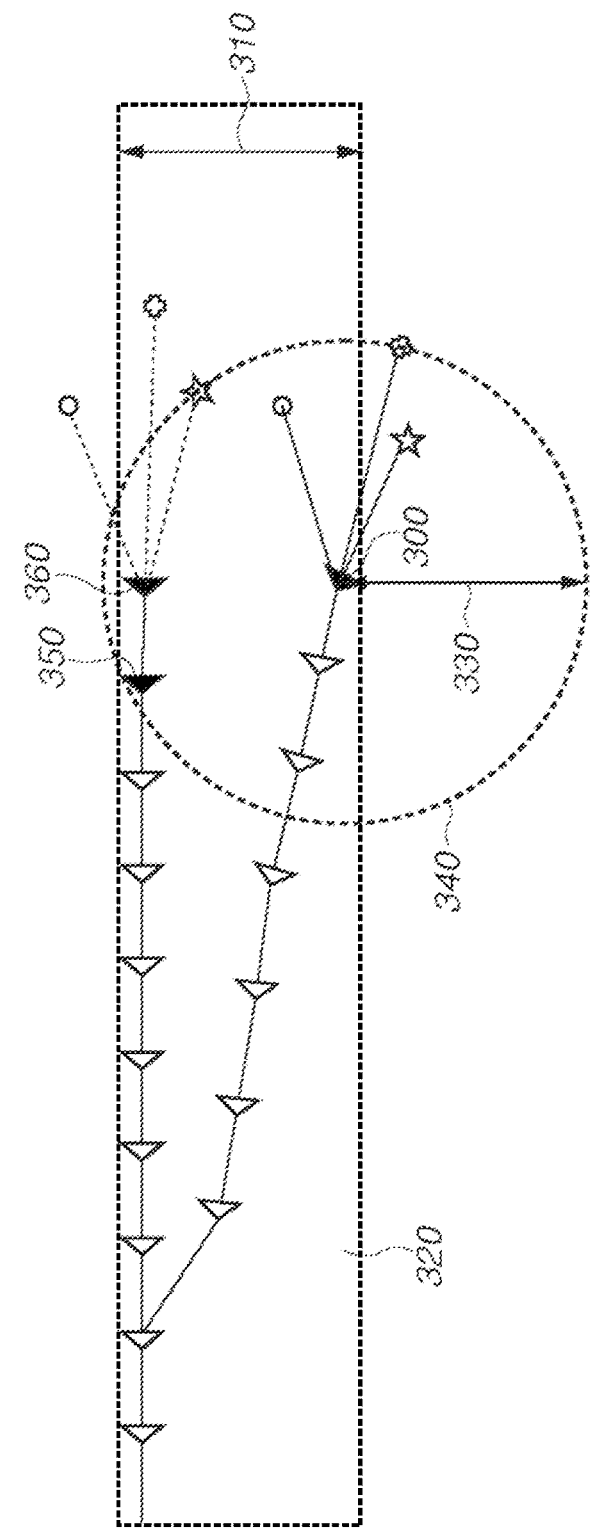

AUTOMATIC GUIDED VEHICLE POSITIONING BASED UPON PASSAGE WIDTH

BACKGROUND

Field of the Disclosure

The present disclosure relates to a technique for creating three-dimensional map information about an environment in which a mobile object moves.

Description of the Related Art

Position and orientation estimation processing for an image capturing apparatus using information about images captured by the image capturing apparatus is used for various purposes such as self-location estimation for autonomous traveling of a mobile object, such as a robot, and three-dimensional modeling of an object or a space. A three-dimensional map is used for the position and orientation estimation processing. The three-dimensional map represents an environment in which image features detected from image information and three-dimensional positional information about image features that is calculated based on the image features are used as map elements.

Raul Mur-Artal, J. M. M. Montiel and Juan D. Tardos, "ORB-SLAM2: an Open-Source SLAM System for Monocular, Stereo and RGB-D cameras", IEEE Transactions on Robotics, vol. 33, no. 5, pp. 1255-1262, 2017, discusses a method in which if a new map element that is not held in a three-dimensional map is observed during the position and orientation estimation processing, the new map element is associated with the map elements already held in the three-dimensional map, and position and orientation information about the new map element is corrected. Accumulation errors in the position and orientation estimation processing can be reduced by correcting the position and orientation information.

However, in the method discussed by Raul Mur-Artal, J. M. M. Montiel and Juan D. Tardos, "ORB-SLAM2: an Open-Source SLAM System for Monocular, Stereo and RGB-D cameras", IEEE Transactions on Robotics, vol. 33, no. 5, pp. 1255-1262, 2017, there is a need to check whether map elements that are included in the map elements already held in the three-dimensional map and are less likely to be associated with a new map element are associated with the new map element, which increases a processing load for the map element association processing.

SUMMARY

Some embodiments of the present disclosure have been made in view of the above-described issue and are directed to reducing a processing load for processing of associating map elements already held in a three-dimensional map with a new map element.

An information processing apparatus includes a first selection unit configured to select at least one map element from first three-dimensional map information including a plurality of map elements, the plurality of map elements each including a position and orientation of an image capturing apparatus mounted on a mobile object and three-dimensional positional information in an environment about a feature point included in an image of the environment captured by the image capturing apparatus, the position and orientation of the image capturing apparatus being estimated based on the image of the environment captured by the image capturing apparatus, a second selection unit configured to select a map element including a feature point with three-dimensional positional information within a predetermined distance from a position indicated by the three-dimensional positional information about a feature point included in the map element selected by the first selection unit from among map elements in second three-dimensional map information preliminarily created for the environment, and an association unit configured to associate the map element selected by the first selection unit with the map element selected by the second selection unit.

Further features of various embodiments will become apparent from the following description of exemplary embodiments with reference to the attached drawings.

BRIEF DESCRIPTION OF THE DRAWINGS

FIG. 3 illustrates an example of second map element selection processing according to the exemplary embodiment.

DESCRIPTION OF THE EMBODIMENTS

In a first exemplary embodiment, an information processing apparatus is to be described. The information processing apparatus executes position and orientation estimation processing by simultaneous localization and mapping (SLAM) on a camera mounted on a mobile robot that moves along a predetermined path. For example, in a case where the robot has changed the path to avoid an obstacle, or in a case where the layout of peripheral objects is changed, a new map element is added to three-dimensional map information (hereinafter also referred to simply as a "map"). To reduce errors included in the position and orientation of the camera in the added map element, the information processing apparatus according to the present exemplary embodiment associates the added map element with existing map elements. In this case, a range in which existing map elements are searched for is narrowed down to a predetermined range based on the estimated position of the camera included in the added map element, so that the number of map elements to be subjected to optimization processing is reduced. As a result, a processing load is reduced. The details of the optimization processing will be described below.

Components described in the present exemplary embodiment are merely examples, and some embodiments are not limited to the illustrated components.

Figure 1:
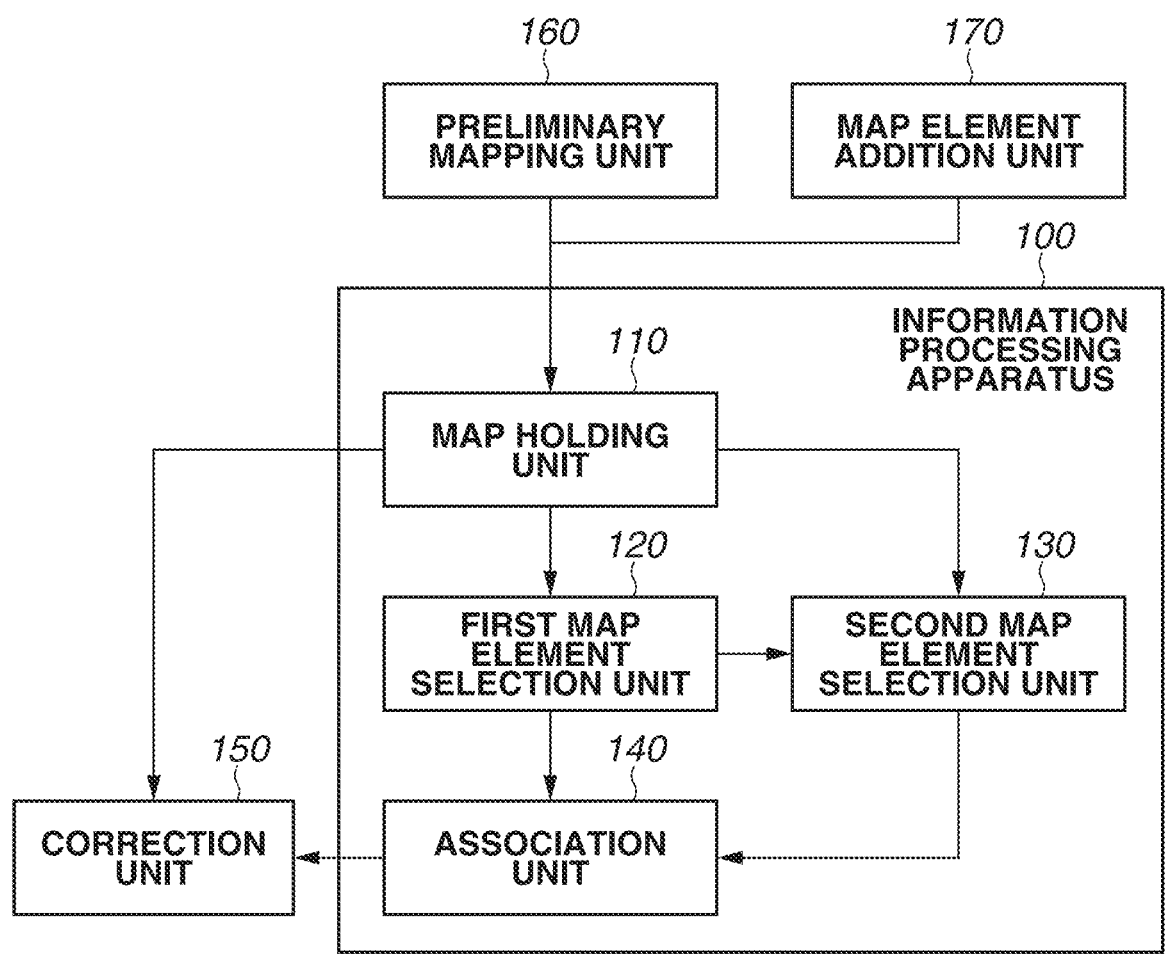
FIG. 1 is a block diagram illustrating an overall configuration of a mobile robot including an information processing apparatus according to an exemplary embodiment.

FIG. 1 is a block diagram illustrating a functional configuration example of the information processing apparatus according to the present exemplary embodiment.

An information processing apparatus 100 includes a map holding unit 110, a first map element selection unit 120, a second map element selection unit 130, and an association unit 140. The map holding unit 110 holds a map created by a preliminary mapping unit 160. The preliminary mapping unit 160 measures an environment in which the mobile robot moves before processing to be described in the present exemplary embodiment is executed, and creates a three-dimensional map representing the environment. The map includes a plurality of map elements. Each map element holds three-dimensional positional information (observation feature point information) about an observation target feature point observed with, for example, a stereo camera, and position and orientation information about the camera at each position and orientation estimation point. In the following description, assume that the observation feature point information includes three-dimensional positional information about an observed feature point. A map element addition unit 170 adds a newly measured map element to the map held by the map holding unit 110. The map elements include two types of map elements, i.e., a map element (existing map element) that has been optimized by a correction unit 150 and is already held in the map, and a map element (additional map element) that is added by the map element addition unit 170 and has not been optimized. To discriminate these two types of map elements, each map element also holds information indicating whether to be optimized. The first map element selection unit 120 selects one map element (additional map element) that is included in the map and has not been optimized. In the present exemplary embodiment, assume that one additional map element is selected. The second map element selection unit 130 selects, from a preliminarily created map, map elements (existing map elements) including observation feature point information about a feature point position similar to observation feature point information included in the additional map element selected by the first map element selection unit 120. The association unit 140 estimates a correspondence relationship between the observation feature point information included in the additional map element selected by the first map element selection unit 120 and the observation feature point information included in the existing map elements selected by the second map element selection unit 130.

The correspondence relationship at each observation feature point obtained by the association unit 140 is used for the correction unit 150 to perform optimization processing on the position and orientation information about the camera included in the map element. In the optimization processing performed by the correction unit 150, a difference between the position and orientation information about the camera included in the additional map element selected by the first map element selection unit 120 and the position and orientation information about the camera included in the existing map elements selected by the second map element selection unit 130 is obtained based on the correspondence relationship at each observation feature point. To eliminate the difference, the correction unit 150 corrects the position and orientation information about the camera included in the additional map element selected by the first map element selection unit 120. In the present exemplary embodiment, the optimization processing is performed as bundle adjustment processing. In addition to the bundle adjustment processing, optimization processing, such as reprojection error minimization processing or interactive closet point (ICP) processing, can be used.

Figure 4:
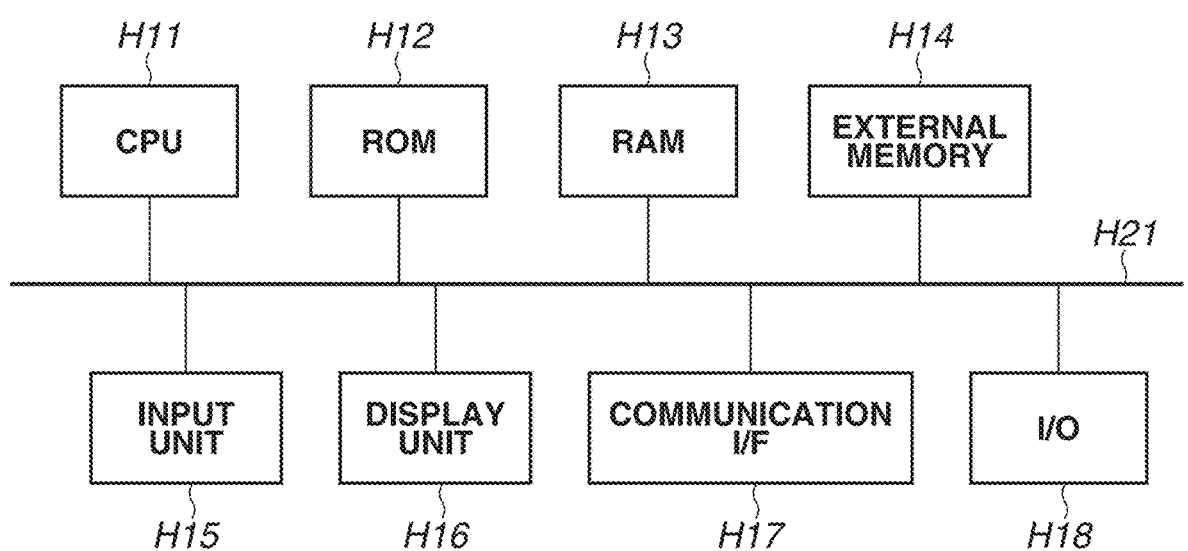
FIG. 4 is a block diagram illustrating a hardware configuration example of the information processing apparatus.

FIG. 4 is a block diagram illustrating a hardware configuration example of the information processing apparatus 100. A central processing unit (CPU) H11 controls various devices connected to a system bus H21. A read-only memory (ROM) H12 stores programs, such as a basic input/output system (BIOS) program and a boot program. A random access memory (RAM) H13 is used as a main storage device for the CPU H11. An external memory H14 stores programs to be processed by the information processing apparatus 100. An input unit H15, such as a keyboard or a mouse, performs processing about an input of information or the like. A display unit H16 outputs calculation results from the information processing apparatus 100 to a display device in response to an instruction from the CPU H11. The type of the display device is not particularly limited. For example, a liquid crystal display device, a projector, or a light-emitting diode (LED) indicator can be used. A communication interface H17 communicates information via a network. The type of the communication interface H17 is not particularly limited. For example, Ethernet®, universal serial bus (USB) or serial communication, or wireless communication can be used. A control unit of the mobile object (not illustrated) exchanges the calculated position and orientation information via the communication interface H17. An input/output (I/O) H18 receives images from an image capturing apparatus (not illustrated).

Figure 2:
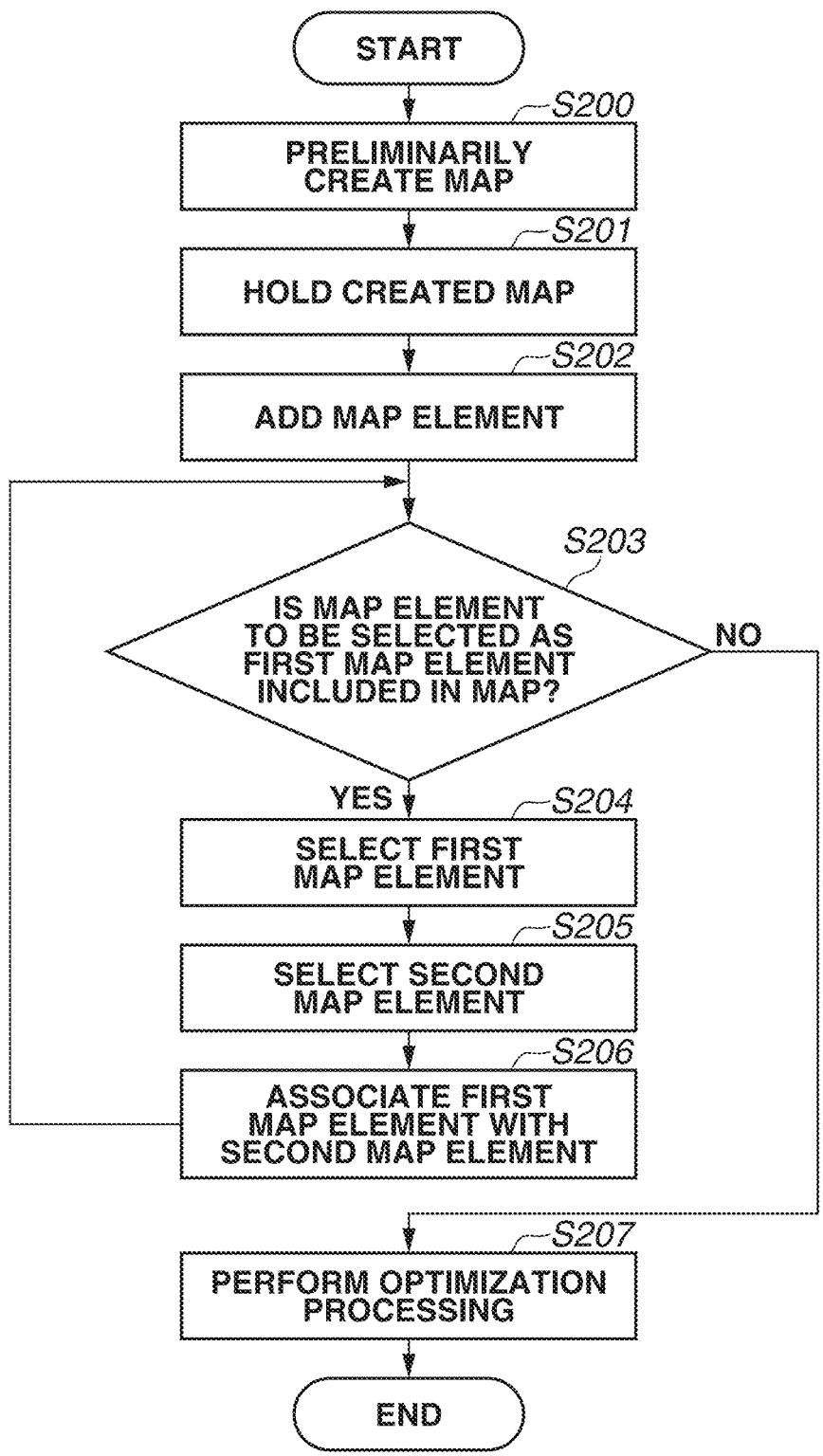
FIG. 2 is a flowchart illustrating processing to be performed by the information processing apparatus according to the exemplary embodiment.

FIG. 2 is a flowchart illustrating an operation of the information processing apparatus 100. In the following description, assume that the flowchart is implemented such that the CPU H11 executes control programs. The operation of the information processing apparatus 100 is started when an instruction to start the movement of the mobile object is issued. A case where all operations are executed in the information processing apparatus 100 will be described below. However, S200 to S202 and S207 may be executed by an external apparatus of the information processing apparatus 100, and the information processing apparatus 100 may start the processing from S203.

In S200, the preliminary mapping unit 160 preliminarily creates a three-dimensional map representing an environment in which the mobile robot moves. The information processing apparatus 100 may execute S200, or the information processing apparatus 100 may skip S200, while a map is created by another apparatus.

In S201, the map holding unit 110 holds the map created by the preliminary mapping unit 160 in S200. All maps created by the preliminary mapping unit 160 can be held in the map holding unit 110. Alternatively, preliminarily created maps may be held in an external server connected via a network, and a map to be used for processing in the information processing apparatus 100 may be downloaded and held in the map holding unit 110.

After that, when a new map element is measured in position and orientation estimation processing, the map element addition unit 170 adds the map element to the map held in the map holding unit 110 in S202. The information processing apparatus 100 may execute S202, or the information processing apparatus 100 may skip S202.

In S203, the first map element selection unit 120 determines whether a map element to be selected as a first map element is included in the map held in the map holding unit 110. Specifically, the first map element selection unit 120 determines whether a map element that is not selected by the first map element selection unit 120 and is to be subjected to optimization processing in the correction unit 150 is included in the map. In this case, there is no need to select all map elements on which optimization processing is not performed by the correction unit 150 as the first map element, and only the map elements to be subjected to optimization processing may be selected. For example, if one map element that is added last is selected as the first map element, the correction unit 150 executes optimization processing every time a map element is added.

If a map element to be selected as the first map element is included in the map (YES in S203), the processing proceeds to S204. In S204, the first map element selection unit 120 selects the first map element. In the present exemplary embodiment, one additional map element is selected.

In S205, existing map elements including observation feature point information about a feature point position similar to observation feature point information included in the additional map element selected by the first map element selection unit 120 in S204 are selected. Accordingly, a search range of map elements to be selected by the second map element selection unit 130 is first determined. A method for determining the search range will be described below. After the search range is determined, the second map element selection unit 130 selects existing map elements included in the search range.

In S206, the association unit 140 associates the first map element with the second map element. The association method is similar to the method discussed by Raul Mur-Artal, J. M. M. Montiel and Juan D. Tardos, "ORB-SLAM2: an Open-Source SLAM System for Monocular, Stereo and RGB-D cameras", IEEE Transactions on Robotics, vol. 33, no. 5, pp. 1255-1262, 2017. Specifically, a set of the map element selected in S204 and an observation feature point with a similar feature point position from an observation feature point group included in the map element selected in S205 is searched.

After that, the processing returns to S203, and if there is another first map element to be selected, the processing of S204 to S206 is repeated. If there is no first map element to be selected (NO in S203), the processing proceeds to S207. In S207, the correction unit 150 corrects the position and orientation information about the camera included in the additional map element selected by the first map element selection unit 120 based on the correspondence relationship obtained by the association unit 140. The correction method is similar to the method discussed by Raul Mur-Artal, J. M. M. Montiel and Juan D. Tardos, "ORB-SLAM2: an Open-Source SLAM System for Monocular, Stereo and RGB-D cameras", IEEE Transactions on Robotics, vol. 33, no. 5, pp. 1255-1262, 2017.

The processing flow is executed by the information processing apparatus 100 as described above.

In the present exemplary embodiment, a prescribed distance is determined in a case of searching for a map element to be selected by the second map element selection unit 130, and existing map elements where the position of the camera is within the search range with a radius corresponding to the distance are selected. If the existing map elements are within the prescribed distance from the additional map element, it is highly likely that the existing map elements may include a common feature point. This is because the existing map elements are more likely to be associated with the additional map element. In the present exemplary embodiment, the radial distance is determined based on an area in which the mobile robot is movable.

In the present exemplary embodiment, the size of the search range is determined based on the width of a passage through which the mobile robot passes. Specifically, flat surfaces corresponding to the floor and walls are allocated to the observation feature point group associated with the additional map element selected by the first map element selection unit 120, and the passage width is calculated based on a positional relationship between the flat surfaces (between walls). This makes it possible to set the search range depending on the environment even when the area in which the mobile robot is movable varies. A range that covers all existing map elements that can be associated with another map element by the association unit 140 can be set as the search range.

FIG. 3 illustrates an application example of the method of determining the search range for map elements to be selected by the second map element selection unit 130 according to the present exemplary embodiment. First, a passage width 310 of a passage 320 in which an additional map element 300 selected by the first map element selection unit 120 is present is calculated. A circle 340 that is drawn about the additional map element 300 selected by the first map element selection unit 120 and has a radius 330 corresponding to the calculated passage width 310 is set as the search range for map elements to be selected by the second map element selection unit 130. The second map element selection unit 130 selects existing map elements 350 and 360 included in the circle 340 as the existing map elements to be associated with the additional map element 300 by the association unit 140.

The search range determination method is not limited to the method of calculating a passage width based on observation feature point information. For example, the search range may be determined by the following method. That is, passage widths on a path are measured in advance, a look-up table on which the passage widths corresponding to the respective positions on the path are recorded is created, and the search range is determined with reference to the look-up table based on the position of the mobile robot. Fixed passage widths of all passages may be determined. Instead of using a camera that outputs brightness information, sensors, such as an infrared sensor, a Time-Of-Flight (TOF) sensor, and a distance image sensor, may be separately prepared and each passage width may be calculated based on measurement results from the sensors.

Instead of executing optimization processing every time a map element is added, a three-dimensional map including map elements in a state where three-dimensional positions of the position and orientation of the camera and feature points are deviated may be created once and optimization processing may be performed subsequently. In this case, the processing of the information processing apparatus 100 is started from S203 in FIG. 2.

The search range may be determined depending not only on the area in which the mobile robot is movable but also on a distance from a point where the addition of a map element to the map is started to a sensor measurement position in the additional map element selected by the first map element selection unit 120. A search range determination method in which, for example, an environment including no walls and a case where the mobile object returns to the original path while avoiding obstacles is taken into consideration can be employed. In this case, the search range is set such that the size of the search range increases as the distance from the point where the addition of a map element to the map is started to the camera measurement position in the additional map element selected by the first map element selection unit 120 increases. For example, the search range is determined based on a lateral movement distance with respect to a traveling direction of the mobile object from the point where the addition of a map element to the map is started to the camera measurement position in the additional map element selected by the first map element selection unit 120 based on the position and orientation estimation information about the camera included in the additional map element. The lateral movement distance is set as the radius of a circle corresponding to the search range for map elements to be selected by the second map element selection unit 130. The lateral movement distance corresponds to, for example, the distance that the mobile object travels while avoiding obstacles and returns to the original path. Alternatively, the size of the search range may correspond to a sine value at the following angle with respect to the distance from the point where the addition of a map element to the map is started to the camera measurement position in the additional map element selected by the first map element selection unit 120. The angle is an angle formed between the orientation of the camera included in the additional map element at the point where the addition of a map element to the map is started and the orientation of the camera included in the additional map element selected by the first map element selection unit 120.

In the present exemplary embodiment, the first map element selection unit 120 selects one additional map element, but instead may select existing map elements. In this case, the map held by the map holding unit 110 may or may not include an additional map element.

As described above, in the first exemplary embodiment, the search range for map elements to be selected by the second map element selection unit 130 is determined in consideration of a distance in a physical environment, such as a passage width or a distance that the mobile object travels while avoiding obstacles. This leads to a reduction in processing load for map element association processing. The optimization processing to be performed on the map elements makes it possible to accurately measure the position and orientation of the mobile object. Consequently, the mobile object can stably move.

Modified Example 1 will now be described. In Modified Example 1, a modified example of S205 will be described. A method for reducing the processing load by narrowing down the search range for map elements to be selected by the second map element selection unit 130 to map elements including observation feature point information about a feature point position similar to observation feature point information included in the map element selected by the first map element selection unit 120 will be described.

The functional configuration diagram and processing flow of the information processing apparatus 100 are similar to those of the first exemplary embodiment, and thus the descriptions thereof are omitted. Only differences between the first exemplary embodiment and Modified Example 1 will be described.

In Modified Example 1, each map element holds identification information about the map element including a feature point position similar to a feature point included in the map element. Specifically, like in the method discussed by Raul Mur-Artal, J. M. M. Montiel and Juan D. Tardos, "ORB-SLAM2: an Open-Source SLAM System for Monocular, Stereo and RGB-D cameras", IEEE Transactions on Robotics, vol. 33, no. 5, pp. 1255-1262, 2017, each map element holds a common feature point number graph representing the number of observation feature points that are common among the map elements for observation feature points included in each map element. A greater value on the common feature point number graph indicates that the map elements connected on the graph have a larger number of common observation feature points, and thus the map elements are considered as map elements to be selected by the second map element selection unit 130.

Details of processing of Modified Example 1 in S205 will be described.

First, a determination criterion for the common feature point number graph is determined. The determination criterion is that the number of common feature points is more than or equal to a predetermined number of points.

Next, the second map element selection unit 130 selects map elements where the value of the common feature point number graph for the map element selected by the first map element selection unit 120 is more than or equal to the determination criterion. In the selected map elements, map elements selected from among the existing map elements correspond to the map elements selected by the second map element selection unit 130.

The method of searching for map elements to be selected by the second map element selection unit 130 according to Modified Example 1 is described above.

As the determination criterion for the common feature point number graph, the same criterion may be used for all map elements selected by the first map element selection unit 120, or different criteria may be set for the respective map elements.

The determination criterion is not limited to the number of common feature points. Even in a case where the number of common feature points is less than the threshold, any search range can be set as long as the search range includes a common feature point. Each map element holds a measurement sequence as a map element identification (ID). The map element ID may be used as the determination criterion. In this case, the number of map element IDs of map elements preceding the map element selected by the first map element selection unit 120 is set as the determination criterion.

The number of map element IDs of all map elements preceding the map element selected by the first map element selection unit 120 may be set to the same value, or may be set to different values. All map elements from the point where the addition of a map element to the map is started to the additional map element selected by the first map element selection unit 120, or a plurality of map elements with map element IDs of map elements preceding the additional map element selected by the first map element selection unit 120, may be selected. In the selected map elements, the existing map elements that satisfy the determination criterion may be set as map elements to be selected by the second map element selection unit 130.

Modified Example 2 will now be described. In Modified Example 2, the second map element selection unit 130 determines the search range by narrowing down the search range for existing map elements to a predetermined range from the camera measurement position in the added map element and further narrowing down the search range to map elements where the value of the common feature point number graph is more than or equal to the determination criterion.

As described in the first exemplary embodiment, the search range for existing map elements to be selected by the second map element selection unit 130 is narrowed down in consideration of the physical environment, and the search range is further narrowed down to the existing map elements that hold a common feature point as described in Modified Example 1. Consequently, the number of map elements to be associated with another map element is reduced, which leads to a further reduction in processing load for map element association processing.

Some embodiments are also implemented by executing the following processing. In other words, software (program) for implementing functions according to one or more of the above-described exemplary embodiments is supplied to a system or an apparatus via a network or various storage media, and a computer (or a CPU, a micro processing unit (MPU), etc.) of the system or the apparatus reads out and executes the program. The program can be provided by being recorded on a computer-readable recording medium.

According to an aspect of some embodiments, it is possible to reduce a processing load for processing of associating map elements already held in a three-dimensional map with a new map element.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-037807, filed on Mar. 9, 2021, which is hereby incorporated by reference herein in its entirety.

What is claimed is:

1. An information processing apparatus comprising:
one or more memories; and
one or more processors, wherein the one or more memories and the one or more processors are configured to:
select a first map element selected from first three-dimensional map information including a plurality of first map elements, wherein each first map element of the plurality of first map elements includes
respective position information and respective orientation information with accumulated error of an image capturing apparatus mounted on an automatic guided vehicle and
respective three-dimensional positional information, in an environment, about a respective feature point included in a respective image of the environment captured by the image capturing apparatus, the respective position information and the respective orientation information of the image capturing apparatus being estimated based on the respective image of the environment captured by the image capturing apparatus, wherein the respective feature point is a respective visual feature in the respective image;
specify, based on a table of a passage width in which the selected first map element is obtained, a distance range from a position indicated by the respective position information included in the selected first map element;
select, from a plurality of second map elements contained in pre-created second three-dimensional map information for the environment, a group of second map elements, wherein each second map element in the plurality of second map elements includes respective position information and respective orientation information of an image capturing apparatus mounted on an automatic guided vehicle and respective three-dimensional positional information, in the environment, about a respective feature point included in a respective image of the environment captured by the image capturing apparatus, wherein a distance between a position indicated by the respective position information included in each second map element in the group of second map elements and the position indicated by the respective position information included in the selected first map element is within the distance range, and wherein a distance between a position indicated by the respective position information included in at least some of the plurality of second map elements and the position indicated by the respective position information included in the selected first map element exceeds the distance range;
select a selected second map element from the group of second map elements based on the respective three-dimensional positional information, about the respective feature point, in the selected first map element and based on the respective three-dimensional positional information, about the respective feature point, in each second map element in the group of second map elements;
correct the respective position information and the respective orientation information of the image capturing apparatus included in the selected first map element to the respective position and the respective orientation information of the image capturing apparatus included in the selected second map element; and
control the automatic guided vehicle to move in a movement direction, wherein the movement direction is based on the corrected position information and the corrected orientation information of the image capturing apparatus included in the selected first map element.

2. The information processing apparatus according to claim 1,
wherein each first map element of the plurality of first map elements further includes at least one respective piece of identification information about a second map element, of the plurality of second maps elements, including a respective feature point position similar to a respective feature point position included in the first map element, and
wherein the one or more memories and the one or more processors are further configured to select the selected second map element based on the selected second map element being indicated by the at least one respective piece of identification information included in the selected first map element.

3. The information processing apparatus according to claim 2, wherein the one or more memories and the one or more processors are further configured to:
determine a determination criterion for feature-point-position similarity; and
select the selected second map element based on the respective feature point position included in the selected second map element and the respective feature point position included in the selected first map element satisfying the determination criterion.

4. The information processing apparatus according to claim 1, wherein the one or more memories and the one or more processors are further configured to add the selected first map element to the second three-dimensional map information.

5. The information processing apparatus according to claim 1, wherein the one or more memories and the one or more processors are further configured to:
add at least one of the plurality of first map elements to the second three-dimensional map information; and
specify a range for a second-map-element search in the second three-dimensional map information based on a distance between a position of the image capturing apparatus at the start of the addition of the at least one of the plurality of first map elements and the respective position of the image capturing apparatus included in the selected first map element.

6. The information processing apparatus according to claim 1, wherein the one or more memories and the one or more processors are further configured to specify the distance range based on an area in which the automatic guided vehicle is movable.

7. The information processing apparatus according to claim 1, wherein the one or more memories and the one or more processors are further configured to:
add at least one of the plurality of first map elements to the second three-dimensional map information; and
select first map elements in a range from an initial first map element of the plurality of first map elements to the selected first map element.

8. The information processing apparatus according to claim 1, wherein the passage width is a width of a passage through which the automatic guided vehicle passes.

9. An information processing apparatus comprising:
one or more memories; and
one or more processors, wherein the one or more memories and the one or more processors are configured to:
select a selected first map element from first three-dimensional map information including a plurality of first map elements, wherein each first map element of the plurality of first map elements includes
respective position information and respective orientation information with accumulated error of an image capturing apparatus mounted on an automatic guided vehicle and
respective three-dimensional positional information, in an environment, about a respective feature point included in a respective image of the environment captured by the image capturing apparatus, the respective position information and the respective orientation information of the image capturing apparatus being estimated based on the respective image of the environment captured by the image capturing apparatus, wherein the respective feature point is a respective visual feature in the respective image;
specify, based on the environment in which the selected first map element is obtained, a distance range from a position indicated by the respective position information included in the selected first map element;
select, from a plurality of second map elements contained in pre-created second three-dimensional map information for the environment, a group of second map elements, wherein each second map element in the plurality of second map elements includes respective position information and respective orientation information of an image capturing apparatus mounted on an automatic guided vehicle and respective three-dimensional positional information, in the environment, about a respective feature point included in a respective image of the environment captured by the image capturing apparatus, wherein a distance between a position indicated by the respective position information included in each second map element in the group of second map elements and the position indicated by the respective position information included in the selected first map element is within the distance range, and wherein a distance between a position indicated by the respective position information included in at least some of the plurality of second map elements and the position indicated by the respective position information included in the selected first map element exceeds the distance range;
select a selected second map element from the group of second map elements based on the respective three-dimensional positional information, about the respective feature point, in the selected first map element and based on the respective three-dimensional positional information, about the respective feature point, in each second map element in the group of second map elements;
estimate a correspondence relationship between the selected first map element and the selected second map element, wherein the correspondence relationship indicates one or more similarities or differences between the respective three-dimensional position information included in the selected first map element and the respective three-dimensional position information included in the selected second map element;
correct the respective position information of the image capturing apparatus included in the selected first map element to the respective position information of the image capturing apparatus included in the selected second map element based on the correspondence relationship; and
control the automatic guided vehicle to move in a movement direction, wherein the movement direction is based on the corrected position information of the image capturing apparatus included in the selected first map element.

10. An information processing method comprising:
selecting a selected first map element from first three-dimensional map information including a plurality of map first elements, wherein each first map element of the plurality of first map elements includes
respective position information and respective orientation information with accumulated error of an image capturing apparatus mounted on an automatic guided vehicle and
respective three-dimensional positional information, in an environment, about a respective feature point included in a respective image of the environment captured by the image capturing apparatus, the respective position information and the respective orientation information of the image capturing apparatus being estimated based on the respective image of the environment captured by the image capturing apparatus, wherein the respective feature point is a respective visual feature in the respective image;
specifying, based on the environment in which the selected first map element is obtained, a distance range from a position indicated by the respective position information included in the selected first map element;

selecting, from a plurality of second map elements contained in pre-created second three-dimensional map information for the environment, a group of second map elements, wherein each second map element in the plurality of second map elements includes respective position information and respective orientation information of an image capturing apparatus mounted on an automatic guided vehicle and respective three-dimensional positional information, in the environment, about a respective feature point included in a respective image of the environment captured by the image capturing apparatus, wherein a distance between a position indicated by the respective position information included in each second map element in the group of second map elements and the position indicated by the respective position information included in the selected first map element is within the distance range, and wherein a distance between a position indicated by the respective position information included in at least some of the plurality of second map elements and the position indicated by the respective position information included in the selected first map element exceeds the distance range;

selecting a selected second map element from the group of second map elements based on the respective three-dimensional positional information, about the respective feature point, in the selected first map element and based on the respective three-dimensional positional information, about the respective feature point, in each second map element in the group of second map elements;

correcting the respective position information and the respective orientation information of the image capturing apparatus included in the selected first map element to the respective position and the respective orientation information of the image capturing apparatus included in the selected second map element; and controlling the automatic guided vehicle to move in a movement direction, wherein the movement direction is based on the corrected position information and the corrected orientation information of the image capturing apparatus included in the selected first map element.

11. A non-transitory computer-readable storage medium storing therein a program for causing a computer to perform the method according to claim 10.

12. An information processing method comprising:

selecting a selected first map element from first three-dimensional map information including a plurality of first map elements, wherein each first map element of the plurality of first map elements includes
  respective position information and respective orientation information with accumulated error of an image capturing apparatus mounted on an automatic guided vehicle and
  respective three-dimensional positional information, in an environment, about a respective feature point included in a respective image of the environment captured by the image capturing apparatus, the respective position information and the respective orientation information of the image capturing apparatus being estimated based on the respective image of the environment captured by the image capturing apparatus, wherein the respective feature point is a respective visual feature in the respective image;

specifying, based on the environment in which the selected first map element is obtained, a distance range from a position indicated by the respective position information included in the selected first map element;

selecting, from a plurality of second map elements contained in pre-created second three-dimensional map information for the environment, a group of second map elements, wherein each second map element in the plurality of second map elements includes respective position information and respective orientation information of an image capturing apparatus mounted on an automatic guided vehicle and respective three-dimensional positional information, in the environment, about a respective feature point included in a respective image of the environment captured by the image capturing apparatus, wherein a distance between a position indicated by the respective position information included in each second map element in the group of second map elements and the position indicated by the respective position information included in the selected first map element is within the distance range, and wherein a distance between a position indicated by the respective position information included in at least some of the plurality of second map elements and the position indicated by the respective position information included in the selected first map element exceeds the distance range;

selecting a selected second map element from the group of second map elements based on the respective three-dimensional positional information, about the respective feature point, in the selected first map element and based on the respective three-dimensional positional information, about the respective feature point, in each second map element in the group of second map elements;

estimating a correspondence relationship between the selected first map element and the selected second map element, wherein the correspondence relationship indicates one or more similarities or differences between the respective three-dimensional position information included in the selected first map element and the respective three-dimensional position information included in the selected second map element;

correcting the respective position information of the image capturing apparatus included in the selected first map element to the respective position of the image capturing apparatus included in the selected second map based on the correspondence relationship; and controlling the automatic guided vehicle to move in a movement direction, wherein the movement direction is based on the corrected position information of the image capturing apparatus included in the selected first map element.

13. A non-transitory computer-readable storage medium storing therein a program for causing a computer to perform the method according to claim 12.

* * * * *